Patented Dec. 23, 1941

2,267,139

UNITED STATES PATENT OFFICE 2,267,139

VAT DYESTUFFS OF THE ANTHRAQUINONE SERIES AND PROCESS OF PREPARING THEM

Hans Schlichenmaier, Ludwig Berlin, and Walter Noll, Frankfort-on-the-Main, Germany, assignors to General Aniline & Film Corporation, New York, N. Y., a corporation of Delaware No Drawing. Application February 6, 1941, Serial No. 377,670. In Germany February 24, 1940

6 Claims. (Cl. 260—277)

The present invention relates to vat dyestuffs of the anthraquinone series and to a process of preparing them.

We have found that new vat dyestuffs of the anthraquinone series may be obtained by heating to high temperatures, for instance 230° C.–260° C., a compound of the general formula:

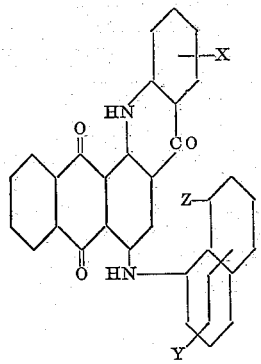

wherein X represents a member of the group consisting of hydrogen, chlorine, methyl and trifluoromethyl and Y represents a member of the group consisting of hydrogen, chlorine and methyl, Z represents hydrogen, halogen or another exchangeable substituent with an alkali, for instance, potassium carbonate in the presence of an indifferent organic diluent and, if desired, in the presence of a small amount of copper or a copper compound.

The new compounds thus obtainable have the following probable formula:

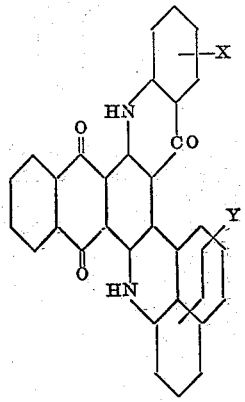

wherein X represents a member of the group consisting of hydrogen, chlorine, methyl and trifluoromethyl and Y represents a member of the group consisting of hydrogen, chlorine and methyl. They are grey-blue to navy-blue vat dyestuffs of good fastness properties. They are distinguished above all by a very good fastness to spotting with water and yield tone-in-tone dyeings on mixed fabrics from cotton and artificial silk.

The parent materials used for the preparation of the vat dyestuffs may be obtained, for instance, by reaction of corresponding 4-aminoacridones with alpha-chloronaphthalenes or corresponding 4-halogen-acridones with alpha-naphthylamines. The preparation of these parent materials and the carrying through of the present process may also be performed in one operation.

The following examples serve to illustrate the invention, but they are not intended to limit it thereto; the parts are by weight:

(1) 22 parts of 4-amino-2.1-anthraquinone-1'.2'-benzacridone of the formula:

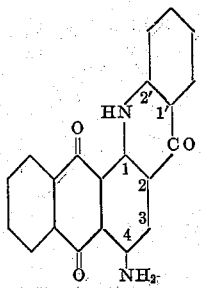

are slowly heated, while stirring, to 210° C. together with 250 parts of alpha-chloronaphthalene, 15 parts of potassium carbonate and 1 part of copper acetate. The blue-green solution gradually turns green. The compound of the following formula is obtained.

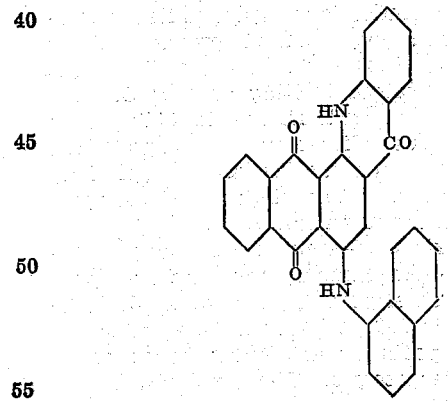

The temperature is then raised to 240° C.–250° C. until a test portion taken from the mixture dissolves in concentrated sulfuric acid to a blue-green solution which is the case after heating for about 20 hours. Thereupon, the reaction mixture is allowed to cool, filtered with suction, the solid matter is dried and the dyestuff is purified by re-vatting. In order to purify the dyestuff, it may be crystallized from trichlorobenzene after drying. It forms then fine blue needles melting at 415° C.; it dissolves in concentrated sulfuric acid to a blue-green solution and yields a Bordeaux vat. In the usual organic solvents such as benzene, chlorobenzene the dyestuff is nearly insoluble even in the heat; its solubility is better in nitrobenzene or trichlorobenzene at boiling temperature. The dyestuff yields blue-grey dyeings which are fast to spotting with water. On mixed fabrics of cotton and artificial silk tone-in-tone dyeings are obtained.

(2) 32.8 parts of 4-amino-2.1-anthraquinone-1'.2'-benz-4'-trifluoromethyl-acridone are heated for 2 hours at 220° C. together with 500 parts of alpha-chloronaphthalene, 0.5 part of copper acetate and 5 parts of potassium carbonate. To the reaction mixture which contains the compound of the formula:

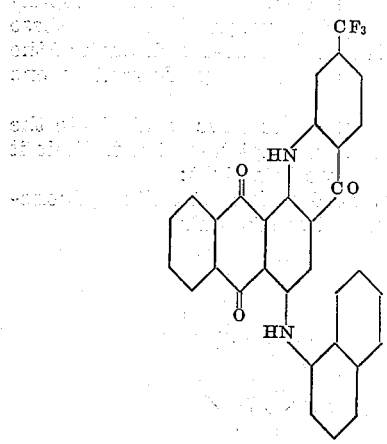

there are added 10 parts of nitrobenzene and the whole is then heated to 240° C.–250° C. until a test portion taken from the mixture no longer yields a violet vat but an olive-brown vat. The whole is then allowed to cool, filtered with suction and the solid matter is dried. In order to purify the dyestuff it is either re-vatted with caustic soda solution and hydrosulfite or sublimed under a very reduced pressure. After crystallization from nitrobenzene fine blue needles are obtained melting at 420° C. The dyestuff dissolves in sulfuric acid to a blue-green solution. From an olive-brown vat it dyes mixed fabrics from cotton and artificial silk staple fiber navy-blue shades. The dyeings are fast to spotting with water and uniform.

(3) 8.2 parts of 4-amino-2.1-anthraquinone-2'.1'-benz-4'-trifluoromethyl-acridone are heated to boiling together with 20 parts of 1.8-dichloronaphthalene in 100 parts of nitrobenzene in the presence of 6 parts of potassium carbonate and 1 part of copper acetate. The dyestuff dissolves first to a green solution with formation of the following compound:

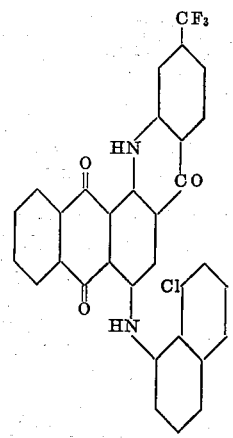

and then to a blue solution with formation of the final dyestuff which is identical with the compound obtained according to Example 2.

(4) 9.4 parts of 4-bromo-1.2-anthraquinone-1'.2'-benz-4'-trifluoromethyl-acridone obtainable from 4-amino-1.2-anthraquinone-1'.2'.-benz-4'-trifluoromethylacridone by substituting bromine for the amino-group according to Sandmeyer, are heated for about 20 hours at 130° C. together with 20 parts of alpha-naphthylamine, 6 parts of potassium carbonate and 1 part of copper acetate. The whole is then allowed to cool, filtered with suction and the solid matter is recrystallized. Green crystals are thus obtained which melt at 358° C.–360° C. 20 parts of this compound having the formula:

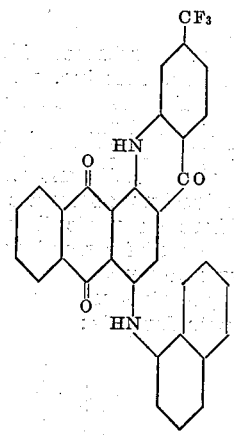

are heated at 240° C.–250° C. in 100 parts of alpha-chloronaphthalene together with 10 parts of potassium carbonate and 5 parts of nitrobenzene until a test portion yields no longer a violet but a brown-olive vat. If this is the case, the dyestuff obtained is purified as described in Example 2. It is identical with that obtained according to Example 2.

(5) 25.8 parts of 4-amino-2.1-anthraquinone-1'.2'-benzene-4'-chloracridone are heated at about 250° C.–260° C. for about 20 hours in 250 parts of alpha-chloronaphthalene in the presence of 10 parts of potassium carbonate and 0.5 part of copper acetate. The dyestuff is obtained from a primary compound which has the following formula:

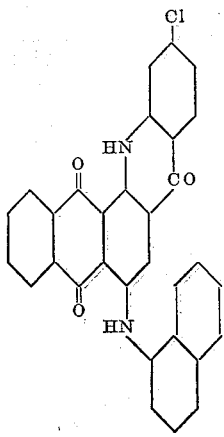

After cooling, the whole is filtered with suction and the dyestuff is purified by re-vatting. Crystallized from trichlorobenzene it forms blue needles melting at 445° C. It dissolves in concentrated sulfuric acid to a blue solution; it yields a brown-olive vat. The dyestuff dyes mixed fabrics from cotton and artificial silk staple fiber uniform navy-blue shades which are fast to spotting with water. Instead of copper acetate there may also be used a small quantity of copper powder (natural copper C) and instead of potassium carbonate there may likewise be used sodium carbonate.

Similarly to the 4-amino-2.1-anthraquinone-1'.2'-benz-4'-chloracridone the 4-amino-2.1-anthraquinone-1'.2'-benz-5'-chloracridone is melted with 1-chloronaphthalene to the corresponding dyestuff. It melts at about 470° C., dissolves in concentrated sulfuric acid to a blue-green solution and dyes cotton and artificial silk from an olive vat after exposure to the air grey shades which are fast to spotting with water.

(6) 27 parts of 4-amino-2.1-anthraquinone-2'.1'-benz-3'.5'-dichloracridone are heated to boiling for 30-40 hours in 250 parts of alpha-chloronaphthalene together with 5 parts of potassium carbonate and 0.5 part of copper acetate. From the components there is first obtained the compound of the following formula:

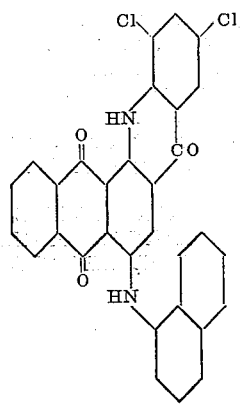

which then passes into the dyestuff. After re-vatting and crystallization from nitrobenzene blue needles are obtained which melt at 415° C. The dyestuff dissolves in concentrated sulfuric acid to a blue-green solution and dyes mixed fabrics from cotton and artificial silk staple fiber navy-blue tone-in-tone dyeings which are fast to spotting with water.

(7) 16 parts of 4-amino-2.1-anthraquinone-2'.1'-benz-4'-trifluoromethylacridone are heated at 190° C. for about 5 hours in 150 parts of nitrobenzene together with 150 parts of 1.5-dichloronaphthalene, 0.5 part of copper acetate and 2.5 parts of potassium carbonate. The mixture thereby becomes green and a test portion taken therefrom after cooling and examined with the microscope shows uniform green crystals. The whole is allowed to cool and the compound formed is filtered with suction. 10 parts of this compound of the following formula:

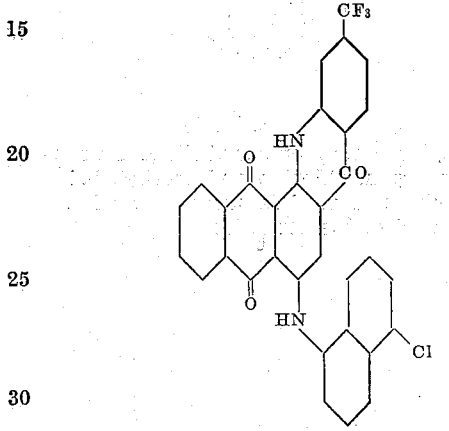

are heated to boiling together with 100 parts of alpha-chloronaphthalene and 3 parts of potassium carbonate until a test portion taken therefrom yields a brown-olive vat. If this is the case, the cooled reaction product is filtered with suction. The dyestuff crystallizes from nitrobenzene in the form of blue small needles containing chlorine and melting at 420° C. It dyes mixed fabrics from cotton and artificial silk staple fiber somewhat redder shades than the dyestuff free from chlorine. The dyeings are fast to spotting with water and tone-in-tone. A dyestuff which likewise contains chlorine but at a different position is obtained by using 1.4-dichloronaphthalene instead of 1.5-dichloronaphthalene. It melts at 415° C.

We claim:

1. The products of the general formula:

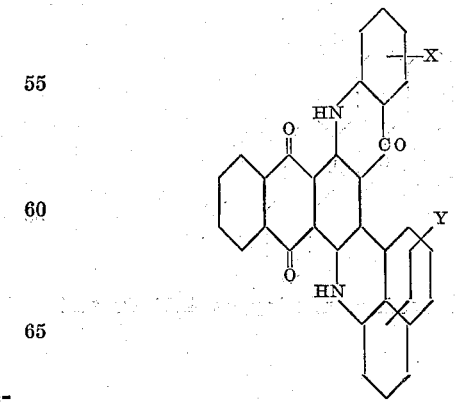

wherein X represents a member of the group consisting of hydrogen, chlorine, methyl and trifluoromethyl and Y represents a member of the group consisting of hydrogen, chlorine and methyl, being blue vat-dyestuffs of good fastness properties.

2. The products of the general formula:

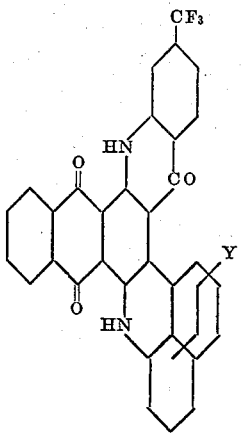

wherein Y represents a member of the group consisting of hydrogen, chlorine and methyl, being blue vat dyestuffs of good fastness properties.

3. The product of the formula:

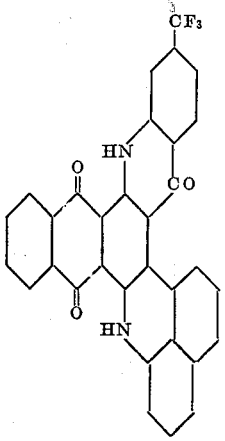

dyeing mixed fabrics from cotton and artificial silk staple fiber from an olive-brown vat uniform navy-blue tints fast to spotting with water.

4. The product of the formula:

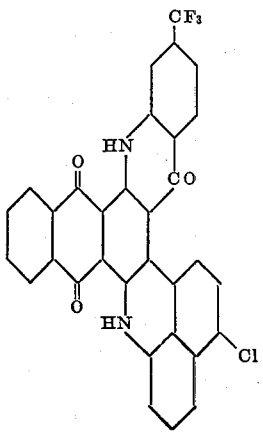

forming blue needles, melting at 420° C. and yielding on mixed fabrics from cotton and artificial silk staple fiber uniform tints which are fast to spotting with water and somewhat redder than the dyestuff free from chlorine.

5. The dyestuff of the formula:

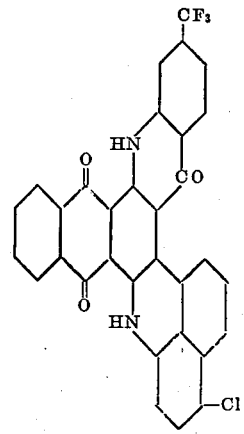

forming blue needles, melting at 415° C. and yielding on mixed fabrics from cotton and artificial silk staple fiber uniform tints which are fast to spotting with water and somewhat redder than the dyestuff free from chlorine.

6. The process which comprises heating at about 230° C.–260° C. in the presence of potassium carbonate, an organic diluent and, if desired, a copper salt a compound of the general formula:

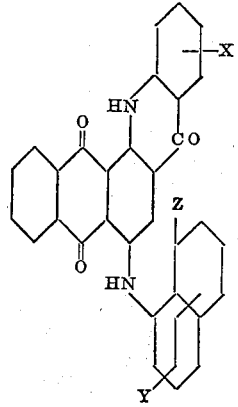

wherein X represents a member of the group consisting of hydrogen, chlorine, methyl and trifluoromethyl, and Y represents a member of the group consisting of hydrogen, chlorine and methyl and Z represents a member of the group consisting of hydrogen and chlorine, until the formation of the vat dyestuff is finished.

HANS SCHLICHENMAIER.
LUDWIG BERLIN.
WALTER NOLL.